Patented Feb. 6, 1940

2,189,262

UNITED STATES PATENT OFFICE 2,189,262

AZO DYESTUFFS

Richard Fleischhauer, Frankfort-on-the-Main-Fechenheim, Germany, assignor to General Aniline & Film Corporation, New York, N. Y., a corporation of Delaware No Drawing. Application November 17, 1937, Serial No. 175,033. In Germany November 26, 1936

2 Claims. (Cl. 260—199)

This invention relates to azodyestuffs, more particularly to those of the general formula: A—N=N—B wherein A stands for the radicle of a diazo component which contains in o-position to the azo group a group capable of being metallized, and B stands for the radicle of a succinylamino-naphthol compound.

The new dyestuffs are prepared by combining the diazo compounds of such diazo components as contain in o-position to the diazotable amino group a group capable of being metallized, with aminonaphthol derivatives which are acylated in the amino group by succinic acid. Besides the new dyestuffs are also obtained by treating the corresponding azodyestuffs which contain a free amino group in their molecule with succinic acid anhydride under suitable conditions.

The employed coupling components containing a succinylamino group may be prepared for example by treating the corresponding amino compounds with succinic acid anhydride in the presence of an acid binding agent. The reaction may be performed mostly with good yields in an aqueous solution, since succinic acid anhydride is fairly stable in cold water. Since the employed diazo and coupling components contain substituents which are capable of being metallized, azodyestuffs are obtained which can be converted in substantia or on the fiber into the corresponding metal complex compounds, whereby the fastness properties of the dyeings are considerably increased.

The new dyestuffs obtained according to the present invention are distinguished by a very good solubility in water. This property is of particular value when the analogous azo dyestuffs which do not contain a free carboxylic acid group in their acylamino radicle can not be employed for dyeing processes on account of their slight solubility in water.

The known azo dyestuffs containing the radicles of other aliphatic carboxylic acids attached to a nitrogen atom are surpassed by the present new products by better solubility, inferior sensitiveness to calcium salts and in some cases by better fastness to seawater. The new dyestuffs which have been aftertreated in substantia with copper or chromium salts are distinguished from the corresponding known products by better solubility and particularly by clearer shades of the dyeings obtained therewith.

The new dyestuffs prepared according to the present invention are particularly useful for the dyeing of wool, followed by an aftertreatment with chromium compounds whereby valuable dyeings of good fastness properties are obtained.

In order to illustrate my invention the following examples are given, the parts being by weight and all temperatures in degrees centigrade.

Example 1

23.4 parts of 4-nitro-2-aminophenol-6-sulfonic acid are diazotized in the usual manner and the diazo solution obtained is combined with an aqueous solution of 26 parts of 2-succinylamino-7-naphthol containing an excess of sodium carbonate. The mixture is stirred for some hours, then the dyestuff formed of the formula:

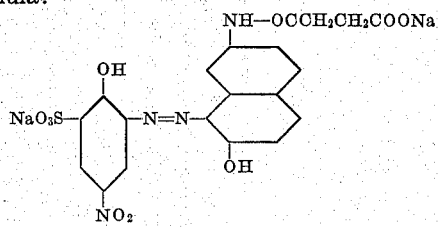

is isolated and dried. It is a blackish brown powder, easily soluble in water, dyeing wool red-brown shades which are converted into dark brown shades fast to fulling, when the dyeings are aftertreated with chromium salts.

The dyestuff formed by combining diazotized 4-chloro-2-aminophenol-6-sulfonic acid with the above coupling component yields violet shades fast to fulling when aftertreated with chromium salts.

Example 2

14.4 parts of 4-chloro-2-aminophenol are diazotized in the usual manner and the diazo solution obtained is combined with an aqueous solution of 40 parts of 2-succinylamino-8-naphthol-6-sulfonic acid containing an excess of sodium carbonate. The mixture is stirred for some hours. Then the dyestuff formed of the formula:

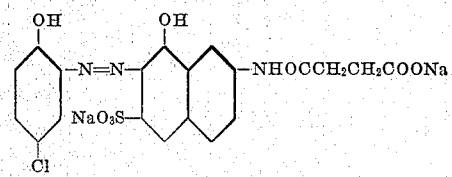

is isolated and dried. It is a dark brown powder very easily soluble in water, dyeing wool bluish red shades which are converted into reddish gray shades when the dyeings are aftertreated with chromium salts.

The analogous dyestuff prepared by employing 1-succinylamino-7-naphthol-3-sulfonic acid as coupling component yields gray shades fast to fulling and light when aftertreated with chromium salts.

When diazotized 6-nitro-4-methyl-2-aminophenol is combined with 2-succinylamino-8-naphthol-6-sulfonic acid, a dyestuff is obtained which yields gray shades when aftertreated with chromium salts, whereas the same diazo component yields with 1-succinylamino-5-naphthol-7-sulfonic acid as coupling component a product which dyes bright violet shades when aftertreated with chromium salts.

*Example 3*

16.8 parts of 6-nitro-4-methyl-2-aminophenol are diazotized in the usual manner and the diazo solution obtained is combined with an aqueous solution of 40 parts of 1-succinylamino-8-naphthol-6-sulfonic acid containing an excess of pyridine. Then the sodium salt of the dyestuff formed of the formula:

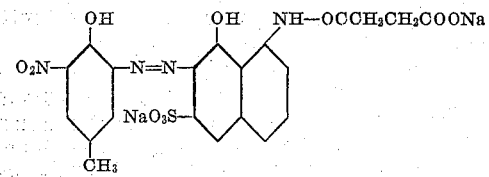

is isolated and dried. It is a dark gray powder, very easily soluble in water, dyeing wool from an acid bath violet shades which are converted into valuable bluish gray shades when aftertreated with chromium salts.

The dyestuff prepared by combining diazotized 5-nitro-2-aminophenol with the above coupling component yields blue-green shades when aftertreated with chromium salts.

I claim:

1. Azo dyestuffs of the general formula: A—N=N—B wherein A stands for the radical of a diazo component of the benzene series which contains in ortho-position to the azo group a group capable of being metallized, and B stands for a member of the group consisting of succinylamino naphthols and succinylamino naphthol sulfonic acids, which azo dyestuffs are distinguished by a good solubility in water and dye the fibers various shades of good fastness properties.

2. The azo dyestuff of the formula:

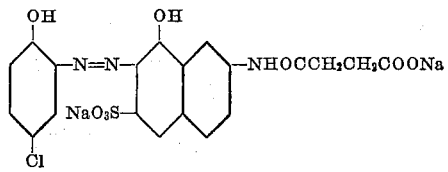

which dyestuff is a dark brown powder, easily soluble in water, dyeing wool bluish red shades which are converted into reddish gray shades when the dyeings are aftertreated with chromium salts.

RICHARD FLEISCHHAUER.